Figure 6:
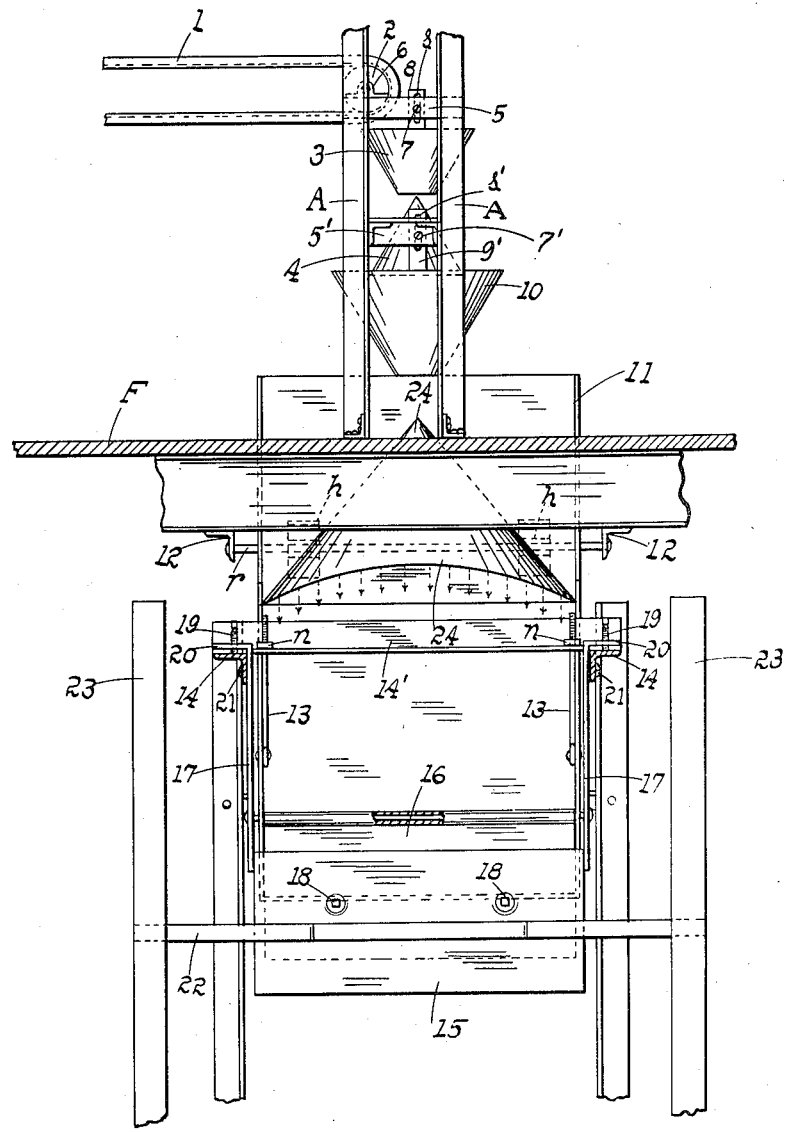

L. T. SICKA.
ORE FEED MIXER AND DISTRIBUTER.
APPLICATION FILED APR. 15, 1912.
1,047,316.
Patented Dec. 17, 1912.
3 SHEETS—SHEET 1.
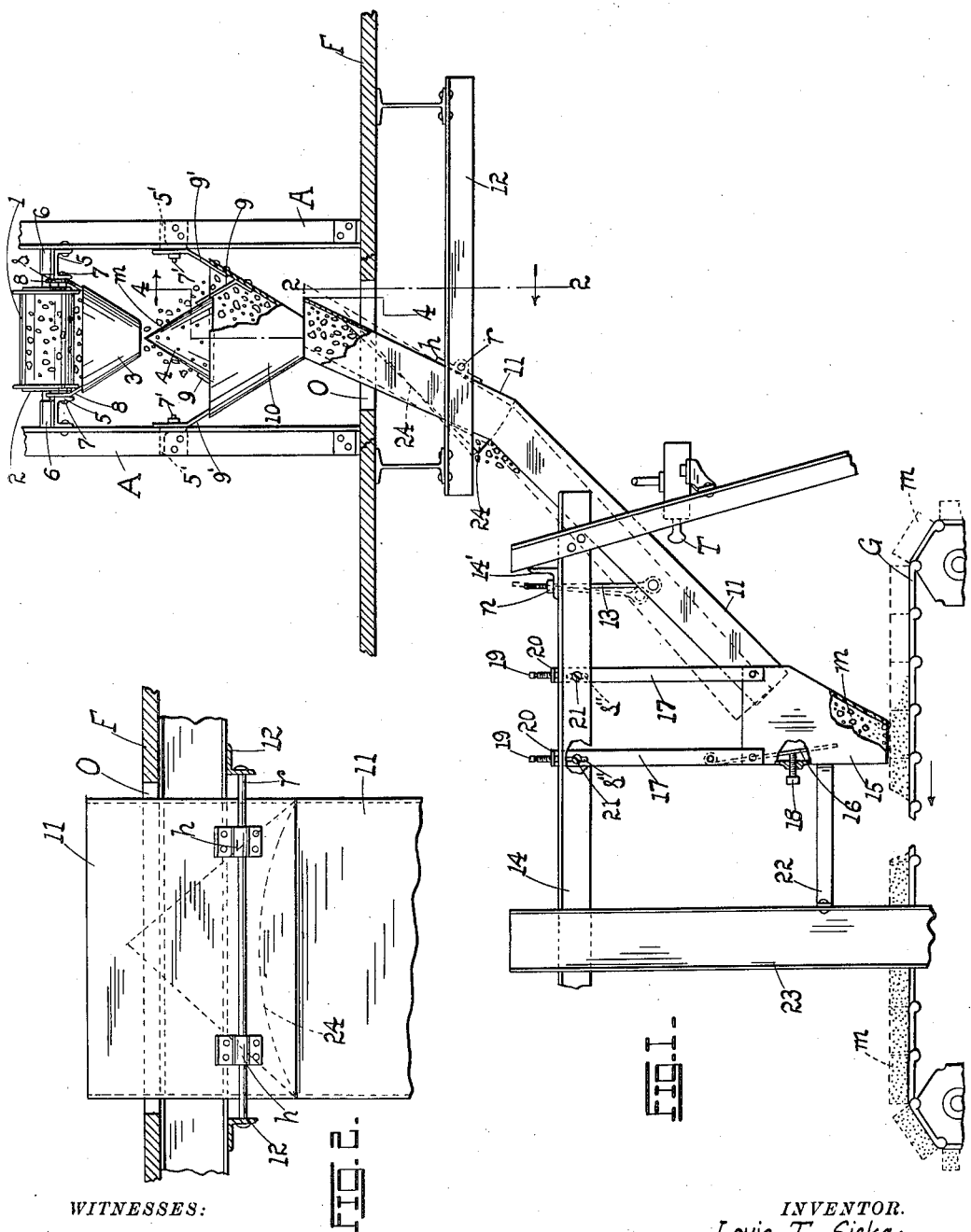
WITNESSES:
Harry A. Beimes
Jos A Michel
INVENTOR.
Louis T. Sicka·
BY
ATTORNEY.

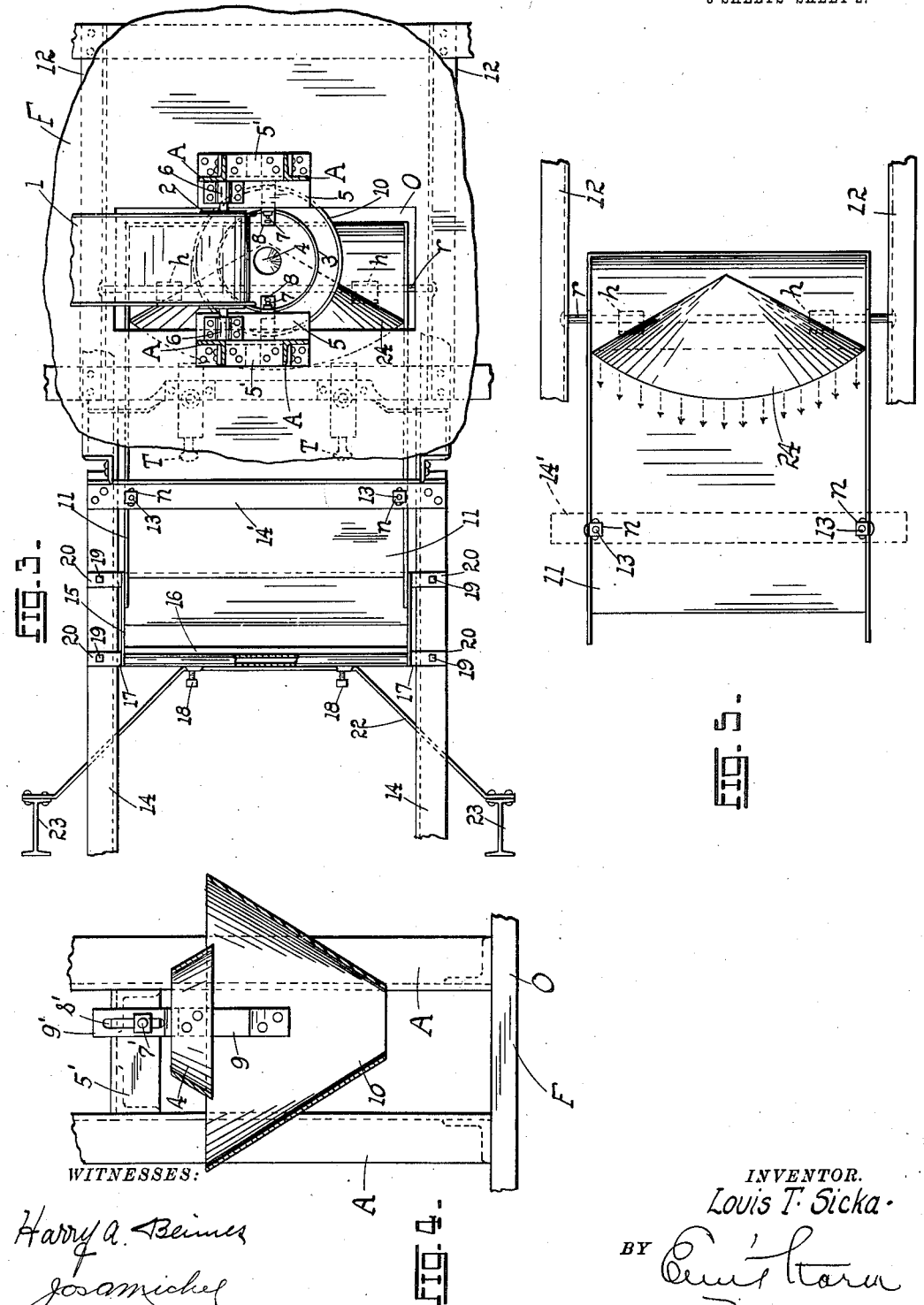

UNITED STATES PATENT OFFICE.

LOUIS T. SICKA, OF TOOELE, UTAH.

ORE FEED-MIXER AND DISTRIBUTER.

1,047,316.

Specification of Letters Patent.

Patented Dec. 17, 1912.

Application filed April 15, 1912. Serial No. 690,919.

*To all whom it may concern:*

Be it known that I, LOUIS T. SICKA, citizen of the United States, residing at Tooele, in the county of Tooele and State of Utah, have invented certain new and useful Improvements in Ore Feed-Mixers and Distributers, of which the following is a full, clear, and exact description, reference being had to the accompanying drawings, forming a part hereof.

My invention has relation to improvements in ore feed-mixers and distributers, and it consists in the novel details of construction more fully set forth in the specification and pointed out in the claims.

In the drawings, Figure 1 is a side elevation of the apparatus, with parts in section; Fig. 2 is a vertical transverse section on the line 2—2 of Fig. 1; Fig. 3 is a top plan with parts broken; Fig. 4 is a vertical transverse enlarged sectional detail on the zig-zag line 4—4 of Fig. 1; Fig. 5 is a top plan of the chute proper, and portions of the supporting girders or angle-beams therefor; and Fig. 6 is a front elevation of the apparatus, or a view looking to the right of Fig. 1.

The present invention is particularly directed to apparatus for mixing, feeding and distributing crushed ore to the traveling grates of sintering apparatus where it is eminently desirable to have the sintered mass as homogeneous as possible throughout, and to turn out a uniform product. In the sintering apparatus referred to, the draft through the ore and its supporting grates is usually from top down, that is to say, it is a downward burning process, the sintering proceeding from the upper layers progressively downward through the mass until the entire charge is sintered. It is important therefore, that the mixture entering into the composition of the sinter charge shall be maintained as uniform and homogeneous as possible, the coarser particles being intimately mixed with the finer ones, and the whole agglomerating into a mass which shall always be uniform. To secure these results, the raw ore-charge must be mixed, and fed so as to be evenly distributed across the feed-chute leading to the sintering grates and be evenly deposited on said grates; and it is the object of my invention to secure such uniformity of feed and distribution as it is possible to attain with material of the character here treated.

The invention in detail may be described as follows:—Referring to the drawings, 1 represents an endless feed-belt passing over a pulley or roller 2 (the opposite end of the belt not being shown) from which the crushed ore, (including fine and coarse material) is discharged into a hollow inverted conical frustum or hopper 3 which in turn discharges the material over the apex of a conical spreader 4. The hopper 3 is secured to the vertical structural members or posts A by means of channel brackets 5, the horizontal legs of which support the bearings 6 of the pulley 2. The hopper 3 is vertically adjustable to and from the cone 4, such adjustment being effected in any suitable mechanical manner, but in the present instance the same is accomplished through the medium of adjusting screws 7 carried by the inner vertical legs of the brackets 5 and operating through vertical slots $s$ in the straps 8 by which the hopper is secured to the brackets. The axes of the hopper 3 and cone 4 are coincident, that is to say, the conical surfaces are described about a common vertical axis whereby the members 3 and 4 become axially superposed. The spreader 4 is preferably secured by straps 9 to a second inverted frusto-conical hopper 10 over which it is likewise axially superposed, the material $m$ flowing over the cone 4 discharging into said hopper 10. In the present case two hoppers and one spreader are illustrated, but any number of alternating conical hoppers and conical spreaders is contemplated by my invention, and I do not wish to be limited to the number constituting the series. The hopper 10 is likewise susceptible of vertical adjustment by means of screws 7′ passed through slots $s'$ of the hangers or straps 9′ which secure the hopper to the brackets 5′ carried by the posts A.

The hopper 10 discharges the material into the intake end of a bent chute 11 hinged at $h$ to the hinge rod $r$ mounted between the horizontal structural members 12 (Fig. 2) below the floor F, the chute passing through an opening O in said floor. The hinging of the chute admits of its accurate adjustment relative to the angle of repose of the material flowing down the chute, so that the rate of flow of the material may be regulated. The adjustment is effected by the nuts $n$ on the suspension bolts 13 pivotally secured at their lower ends to the sides of the chute, the upper ends of the bolts passing loosely through the cross member 14' of the lower frame, as shown. This manner of adjustment is a well known expedient and *per se* is not claimed herein. The discharge end of the chute 11 delivers the thoroughly mixed material into a hopper 15 having a bottom discharge, the hopper being provided with a deflecting plate 16 suspended from the rear pair of hangers or straps 17 by which the hopper is secured to the horizontal structural members 14, the angle of the plate 16 being adjusted from the vertical to any desired degree by screws 18 on the rear wall of the hopper. The latter is adjustable vertically by means of set screws 19 passing through the terminal horizontal bent portions 20 of the straps 17 and resting on the structural members 14, the straps 17 being provided with elongated slots $s''$ through which the securing screws 21 pass, the screws holding the straps firmly to the beams 14. The hopper 15 is further braced by a bent bar 22 whose ends are secured to the vertical structural members 23. To loosen the material (should the same adhere to the chute walls, or hopper walls) I employ suitable steam, mechanical or pneumatic, or electrically driven) tappets or knockers T of any approved design positioned where most convenient and secured in any suitable mechanical manner. The knocker or striker is here shown only conventionally, and *per se* is not claimed herein. The impacts of the knocker will loosen the material and cause it to flow freely, in the event it manifests any tendency to stick by reason of moisture or for any other reason.

It will be seen from the foregoing that the fluent material, be it crushed ore, rock or any substance whatsoever, as it flows through and over the series of conical hoppers and spreaders into the chute 11 will become thoroughly mixed, the coarse and fine particles being homogeneously disposed throughout the mass by the time they reach the upper intake or receiving end of the chute. At the upper end of the chute is disposed a segment of a cone 24, the segment being formed by a plane cutting a cone through the apex and base of the cone, the plane wall of such segment being positioned adjacent the chute bottom, and the apex of the segment pointing upward or in opposition to the direction of flow of the material, and being directly in the path of discharge from the hopper 10. The conical peripheral surface of the segment 24 initially receives the homogeneous material from the hopper 10, and spreads it laterally the full width of the chute, so that an equalization or even distribution of the material across the chute results. This width of the sheet of descending material is maintained even after it leaves the deflecting plate 16 and the discharge mouth of the hopper 15. The hopper 15 delivers the material onto a series of traveling sintering grates G well known in the art, which thus receives the charge of ore (where ore is sintered) in an even sheet or layer across the grates, and the piling thereof at the center or other points is avoided. The distributing and equalizing action of the segment 24 is therefore important, since by means of it the charge is spread across the entire width of the chute 11, and from the latter delivered in a wide sheet onto the grates G. Obviously any adjustment of inclination imparted to the chute 11 will be participated in by the equalizer or spreader 24. The even distribution of the material $m$ over the grates G results in a uniform sintered mass of blocks, such uniform blocks being at the same time homogeneous as to composition by reason of the thorough mixing of the particles in their passage through and over the conical hoppers and spreaders respectively.

The term "cone," "conical," "frustum of a cone" and the like here employed are not to be considered in their strict geometric sense, it being within the contemplation of my invention to include pyramidal and frusto-pyramidal formations, and equivalent converging and diverging surfaces, the true cone formations being however, preferred.

Obviously too, the mixing, feeding and distributing apparatus here described is not to be restricted in its application to the treatment of heterogeneous ore particles with a view of securing their homogeneous mixture and their subsequent even distribution for feeding purposes, but may be employed in any art where fluent material of any description is to be treated for any purpose whatsoever. Mechanical details here illustrated but not referred to, fall within the purview of the skilled mechanic, and a description thereof would be superfluous. For example, the frame work composed of structural members or angle irons, I-beams, and the like is illustrated in a manner well understood in the art and needs no description in this connection.

Having described my invention, what I claim is:—

1. In combination with a feed-chute for delivering fluent material, a conical formation on the chute in the path of flow of the material, the apex of the cone pointing in a direction opposite to the direction of flow of the material, and means for delivering the material over the apex of the conical formation.

2. In combination with a feed-chute for delivering fluent material, a formation having a distributing surface raised above the chute bottom and bounded by sides diverging from a common apex over which the material is initially discharged, the material flowing along, and spreading laterally across, the formation and being thereby distributed across the chute.

3. In combination with a feed-chute for delivering fluent material, a conical formation on the chute in the path of flow of the material, the apex of the cone pointing in a direction opposite to the direction of flow of the material, whereby the latter is distributed across the chute.

4. In combination with a feed-chute for delivering fluent material, a formation having a distributing surface raised above the chute bottom, over which surface the material is caused to flow and spread laterally to the general direction of flow of the material along the chute, whereby the material is caused to be distributed across the chute.

5. In combination with a feed-chute for delivering fluent material, a member comprising a segment of a cone cut by a plane through the apex and the base, mounted on the chute bottom with the plane face of the segment adjacent said bottom and the apex pointing in the direction from which the material is flowing over said member, the base of the segment being disposed across the chute, for the purpose set forth.

6. In combination with a chute, a formation raised above the chute bottom and presenting a surface converging toward an apex disposed in the plane of said bottom, means for feeding material over said apex, the chute being inclined at the proper angle to cause the material to flow over said formation and along the chute.

7. In combination with a chute mounted to oscillate about a horizontal axis, an adjustable hopper at the discharge end of said chute, and an angularly adjustable deflecting plate in the hopper against which the material from the chute is projected.

In testimony whereof I affix my signature, in presence of two witnesses.

LOUIS T. SICKA.

Witnesses:
　H. N. THOMSON,
　O. M. KUCHS.